(12) United States Patent
Liebman et al.

(10) Patent No.: US 12,297,886 B2
(45) Date of Patent: May 13, 2025

(54) OSCILLATION DAMPING

(71) Applicant: General Electric Renovables Espana, S.L., Barcelona (ES)

(72) Inventors: Noah Liebman, Greenville, SC (US); Pascal Brunet, Nantes (FR); Laura Ramirez, Barcelona (ES); Anthony Denis Rousset, Saint-Sébastien-sur-Loire (FR); Laure Pichard, Nantes (FR)

(73) Assignee: General Electric Renovables Espana, S.L., Barcelona (ES)

( * ) Notice: Subject to any disclaimer, the term of this patent is extended or adjusted under 35 U.S.C. 154(b) by 371 days.

(21) Appl. No.: 17/555,967

(22) Filed: Dec. 20, 2021

(65) Prior Publication Data

US 2022/0196103 A1    Jun. 23, 2022

(30) Foreign Application Priority Data

Dec. 21, 2020   (EP) ..................................... 20383126

(51) Int. Cl.
| | |
|---|---|
| *F16F 7/10* | (2006.01) |
| *E04B 1/98* | (2006.01) |
| *E04H 9/02* | (2006.01) |
| *F03D 13/20* | (2016.01) |

(52) U.S. Cl.
CPC ................. *F16F 7/10* (2013.01); *E04B 1/98* (2013.01); *E04H 9/0215* (2020.05); *F03D 13/20* (2016.05); *F05B 2240/912* (2013.01); *F05B 2260/964* (2013.01); *F16F 2222/08* (2013.01)

(58) Field of Classification Search
CPC ...... F16F 15/023; F16F 7/1028; F16F 7/1022; F16F 7/10; F16F 2222/08; F16F 2222/12; F16F 2224/0266; E04B 1/98; E04H 9/0215; F03D 13/20; F05B 2240/912; F05B 2260/964
See application file for complete search history.

(56) References Cited

U.S. PATENT DOCUMENTS

| | | | |
|---|---|---|---|
| 4,953,330 A | | 9/1990 | Noji et al. |
| 2019/0063063 A1* | | 2/2019 | Mechineau ........... E04H 9/0215 |
| 2020/0378466 A1 | | 12/2020 | Madsen |

FOREIGN PATENT DOCUMENTS

| | | |
|---|---|---|
| CN | 102410155 A | 4/2012 |
| DE | 3414706 A1 | 10/1985 |
| DE | 19715714 A1 | 10/1998 |
| JP | 2586667 Y2 | 12/1998 |

(Continued)

OTHER PUBLICATIONS

WO document No. WO 2011/015563 to Rodriguez published on Feb. 10, 2011.*

(Continued)

*Primary Examiner* — Pamela Rodriguez
(74) *Attorney, Agent, or Firm* — Dority & Manning, P.A.

(57) ABSTRACT

The present disclosure relates to a damping system for counteracting oscillations in a construction. The damping system comprises a pendulum device and a container which contains a viscous medium. The pendulum device comprises a mass which comprises a porous structure. The porous structure is configured to allow the viscous medium to pass through it. The porous structure is at least partially submerged in the viscous medium.

11 Claims, 7 Drawing Sheets

(56) References Cited

FOREIGN PATENT DOCUMENTS

WO     WO2009068599 A2     6/2009
WO     WO2019042516 A1     3/2019

OTHER PUBLICATIONS

German Patent No. DE 102015000787 to Seidel published on Jul. 28, 2016.*
Chinese Patent No. CN 110043602 to Munk-Hansen published on May 3, 2022.*
European Search Report Corresponding to EP20383126 on Jun. 22, 2021.

* cited by examiner

OSCILLATION DAMPING

FIELD

The present disclosure relates to a damping system for counteracting oscillations in a construction, and particularly for counteracting oscillations in a wind turbine tower. The present disclosure further relates to a wind turbine tower comprising such damping systems and to methods for counteracting oscillations in a construction.

BACKGROUND

High constructions, such as towers, particularly towers of wind turbines, are subject to the influence of oscillations. Those oscillations may be induced by external forces, such as wind, waves, earthquakes, and the like. Due to the induced oscillations, the constructions may begin to oscillate significantly, particularly in case where the induced oscillation corresponds to a natural frequency of the construction. Those high amplitude oscillations may lead to damage, reduced lifetime, or failure of the construction.

High constructions, for example modern wind turbines, are commonly used to supply electricity to the electrical grid. Wind turbines of this kind generally comprise a wind turbine tower (also referenced as tower within the present disclosure) and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

Wind turbines may be exposed to harsh conditions in on-shore and off-shore applications. Especially, vortex-induced oscillations and off-shore wave loading can be critical load cases for wind turbines. These load cases, e.g. vortices at the upper portion of the wind turbine tower, may lead to lateral oscillations of the wind turbine which may be decisive for critical bending loads of the wind turbine tower. In operation, wind turbines may also reach certain operational rotor speeds that lead to resonance.

These oscillations increase fatigue damage of the structure which can cause catastrophic failure. In the case that the stress in the tower structure is too high, the tower may buckle and/or kink uncontrolledly. Due to the general tendency to increase the size of modern wind turbines, the wind turbine towers are also increasing in size and have an increasingly large mass on top of the tower. Also, towers are increasingly becoming taller and more slender, which lowers their natural frequency and leads to resonance at more common wind speeds and wave frequencies. This results in greater challenges to ensure the stability of these constructions under the above-mentioned critical load cases.

Only optimizing the tower structure, e.g. by adding additional reinforcements, is limited by feasibility, efficiency and economic factors. Thus, additional systems to effectively counteract oscillations such as vortex-induced oscillations and wave loading in off-shore usage are essential for the safety and durability of wind turbines.

In the art, to counteract oscillations of wind turbines, different approaches have been applied. Using aerodynamic solutions represents one option. The aim of aerodynamic solutions is to reduce oscillations by limiting their formation mechanism, e.g. by inhibiting vortices from emerging. Examples include helical strakes or fins being mounted on the wind turbine tower. However, aerodynamic solutions in certain use cases may not be sufficient by themselves.

Further, in the art, oscillation dampers such as rolling mass dampers or tuned mass dampers are described. Different than aerodynamic solutions, these oscillation dampers do not limit the formation mechanism of oscillations but dampen the oscillations. This is generally achieved by the inertia of a movably mounted mass. However, the damper implementation is limited by certain aspects. Particularly for wind turbines which are increasing in size and mass, dampers of large dimensions with a high mass are required. This leads to difficulties with respect to transportation and/or installation, particularly when integrating the damper inside the wind turbine tower. Further, large and/or heavy oscillation dampers mean additional loading on the tower structure and can incur high costs because of the required material and extensive manufacturing.

The present disclosure provides a damping system for counteracting oscillations in a construction that resolve the aforementioned disadvantages, at least partially. Even though specific problems have been described with respect to wind turbine towers, it should be clear that the principles of the present disclosure can also be applied in other constructions, including different towers and buildings.

SUMMARY

In a first aspect of the present disclosure, a damping system for counteracting oscillations in a construction is provided. The damping system comprises a pendulum device and a container which contains a viscous medium. The pendulum device comprises a mass which comprises a porous structure. The porous structure is configured to allow the viscous medium to pass through it. Further, the porous structure is at least partially submerged in the viscous medium.

The term pendulum device as used throughout the present disclosure does not limit the damping system therein that a specific suspension system is implemented. Rather, any pendulum device having a mass that is allowed to swing, is a pendulum device in the sense of the present disclosure.

Due to the swinging mass, oscillations in a construction can be counteracted, i.e. minimized or at least partially reduced. By providing a mass, comprising a porous structure that is at least partially submerged in the viscous medium, oscillations can be dampened even further without the need to e.g. increase the mass of the damping system.

In another aspect, a tuned mass damper for counteracting oscillations in a construction is provided. The tuned mass damper comprises a suspended mass with a porous structure, wherein the porous structure is configured to interact with a viscous fluid such that the porous structure creates turbulence in the viscous fluid when the suspended mass oscillates.

In yet a further aspect, a method for counteracting oscillations in a construction is provided. The method comprises providing a mass, wherein the mass includes a porous structure and providing a container with viscous fluid. The container with viscous fluid may be mounted inside the construction and the method further comprises suspending the mass, such that the porous structure of the mass is at least partially submerged in the viscous fluid.

BRIEF DESCRIPTION OF THE DRAWINGS

In the following, aspects of the present disclosure are described in detail, with respect to the accompanying figures.

DETAILED DESCRIPTION OF EXAMPLES

Reference now will be made in detail to embodiments of the invention, one or more examples of which are illustrated in the drawings. Each example is provided by way of explanation of the invention, not as a limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Respective combinations are explicitly part of the present disclosure. Thus, it is intended that the present invention covers such modifications and variations as come within the scope of the appended claims and their equivalents.

Figure 1:
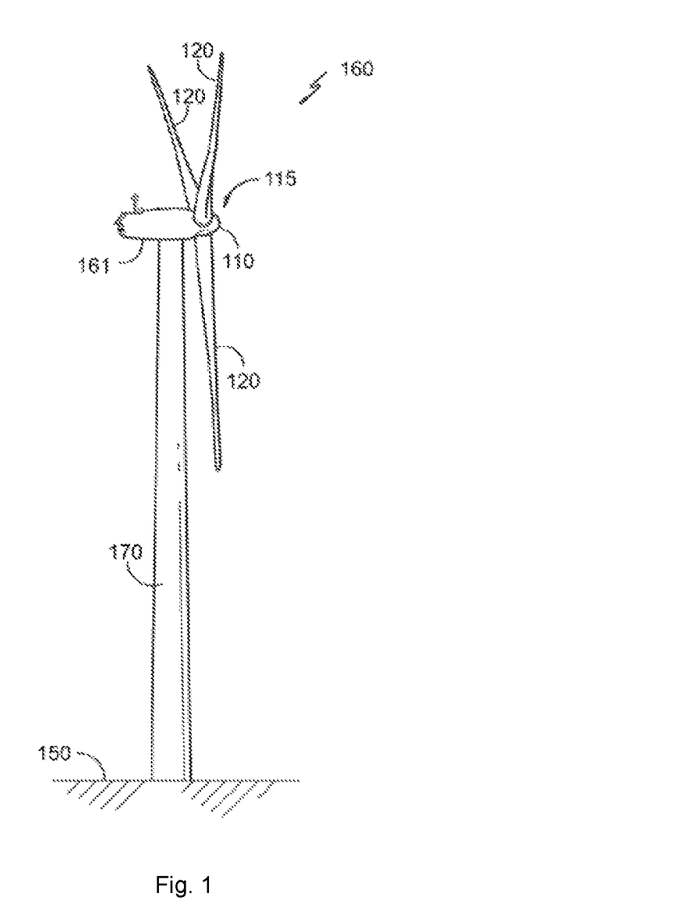
FIG. 1 schematically illustrates a perspective view of one example of a wind turbine.

FIG. 1 illustrates a perspective view of one example of a wind turbine 160. As shown, the wind turbine 160 includes a wind turbine tower 170 extending from a support surface 150, a nacelle 161 mounted on the wind turbine tower 170, and a rotor 115 coupled to the nacelle 161. The rotor 115 includes a rotatable hub 110 and at least one wind turbine blade 120 coupled to and extending outwardly from the hub 110. For example, in the illustrated embodiment, the rotor 115 includes three wind turbine blades 120. However, in an alternative embodiment, the rotor 115 may include more or less than three wind turbine blades 120. Each wind turbine blade 120 may be spaced about the hub 110 to facilitate rotating the rotor 115 to enable kinetic energy to be transferred from the wind into usable mechanical energy, and subsequently, electrical energy. For instance, the hub 110 may be rotatably coupled to an electric generator 162 (FIG. 2) positioned within the nacelle 161 to permit electrical energy to be produced.

Said wind turbine 160 may be exposed to harsh conditions in on-shore and off-shore applications. Especially, vortex-induced oscillations and off-shore wave loading are critical load cases for said wind turbine 160 and/or the wind turbine tower 170. These load cases, e.g. vortices at the upper portion of the wind turbine tower 170, may lead to lateral oscillations of the wind turbine 160 which may lead to critical bending loads of the wind turbine tower.

Figure 2:
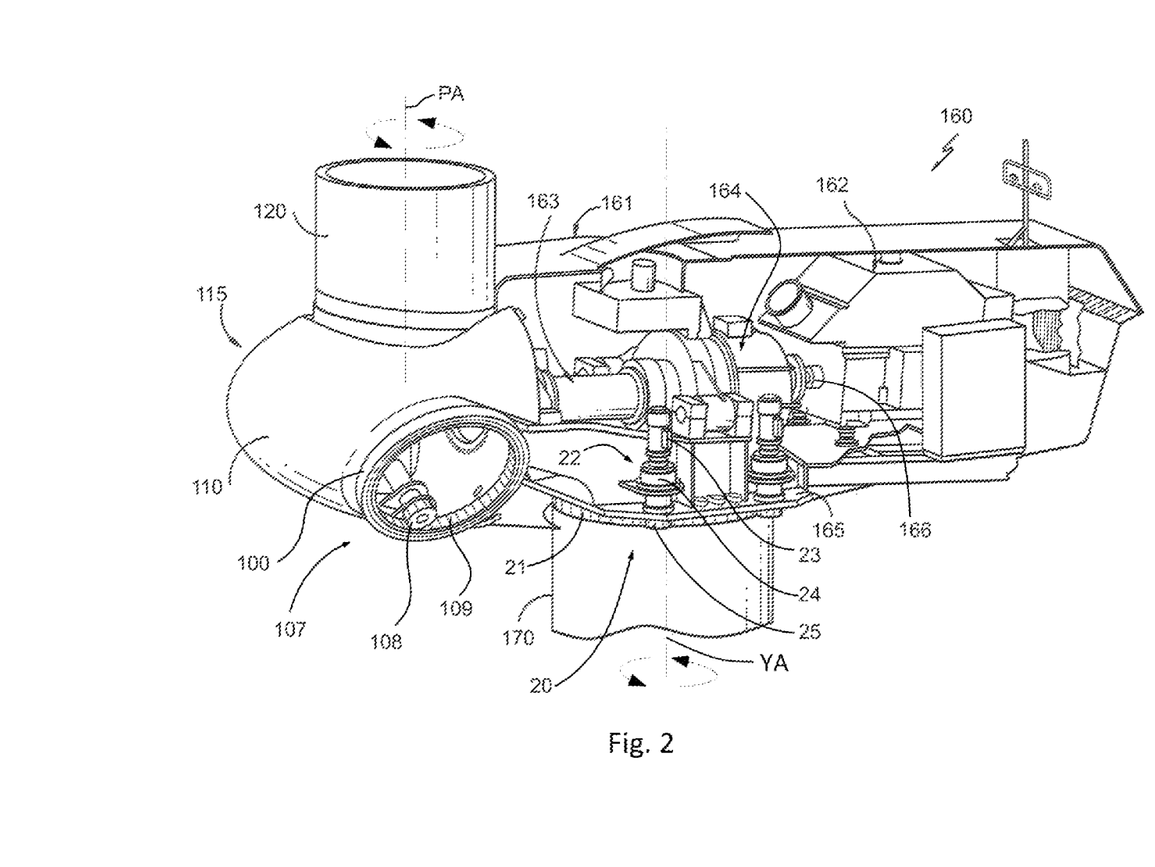
FIG. 2 schematically illustrates a simplified, internal view of one example of the nacelle of the wind turbine of the FIG. 1.

FIG. 2 illustrates a simplified, internal view of one example of the nacelle 161 of the wind turbine 160 of the FIG. 1. As shown, the generator 162 may be disposed within the nacelle 161. In general, the generator 162 may be coupled to the rotor 115 of the wind turbine 160 for generating electrical power from the rotational energy generated by the rotor 115. For example, the rotor 115 may include a main rotor shaft 163 coupled to the hub 110 for rotation therewith. The generator 162 may then be coupled to the rotor shaft 163 such that rotation of the rotor shaft 163 drives the generator 162. For instance, in the illustrated embodiment, the generator 162 includes a generator shaft 166 rotatably coupled to the rotor shaft 163 through a gearbox 164.

It should be appreciated that the rotor shaft 163, gearbox 164, and generator 162 may generally be supported within the nacelle 161 by a support frame or bedplate 165 positioned atop the wind turbine tower 170.

Wind turbine blades 120, and in particular the root portions of the blades, are coupled to the hub 110 with a pitch bearing 100 in between the blade 120 and the hub 110. The pitch bearing 100 comprises an inner ring and an outer ring. A wind turbine blade, particularly the root portion thereof, may be attached either at the inner bearing ring or at the outer bearing ring, whereas the hub is connected at the other. A wind turbine blade 120 may perform a relative rotational movement with respect to the hub 110 when a pitch system 107 is actuated. The inner bearing ring may therefore perform a rotational movement with respect to the outer bearing ring. The pitch system 107 of FIG. 2 comprises a pinion 108 that meshes with an annular gear 109 provided on the inner bearing ring to set the wind turbine blade into rotation around a pitch axis. The wind forces acting on the nacelle 161 and in particular on the wind turbine blades may lead to a further induction of oscillations.

Figure 3:
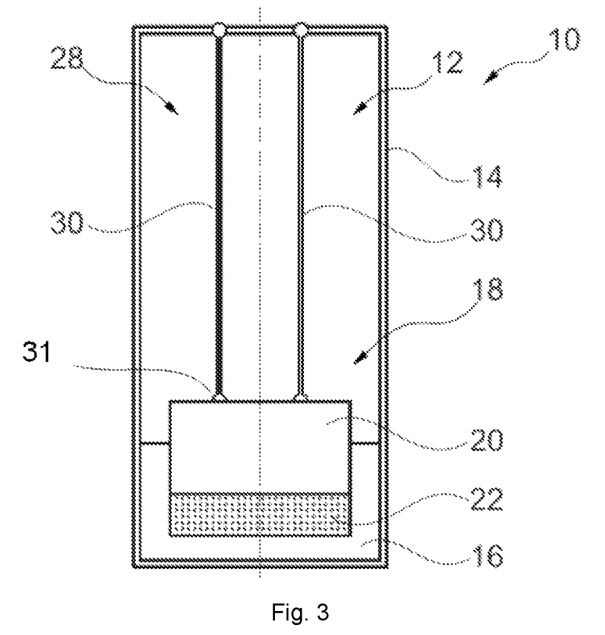
FIG. 3 schematically illustrates an example of a damping system for counteracting oscillations in a construction.

FIG. 3 illustrates an example of a damping system 10 for counteracting oscillations in a construction. The construction may be a tower structure 32 of a wind turbine tower 170 as e.g. shown in FIGS. 6A to 6B.

The illustrated damping system 10 in FIG. 3 comprises a pendulum device 12 and a container 14. The container 14 contains a viscous medium 16, particularly a viscous fluid. The fill level of the container can be adapted to the desired level of damping. This can be done manually, or automatically, depending on the required or desired level of damping. In the present example, the pendulum device 12 further comprises a mass 18 which comprises a porous structure 22. The porous structure 22 is configured to allow the viscous medium 16 to pass through it. As illustrated, the porous structure 22 of the pendulum device 12 is at least partially submerged in the viscous medium 16. In a different example the mass 18 may be completely submerged in the viscous medium 16, e.g. deepening on the fill level of the container 14.

The damping system 10 as depicted herein may be regarded as a tuned mass damper.

In the example illustrated in FIG. 3, the mass 18 may comprise a pendulum mass 20, wherein the porous structure 22 may be attached to the pendulum mass 20. The porous structure 22 may include a porous baffle 22. In the example of FIG. 3, the porous baffle 22 may be formed as a downwardly extending skirt of the mass 20. An aspect of a downward extending skirt is that the baffle may be more effective. The lowest part of the mass with baffle is the part of the pendulum that is displaced most in oscillation. The baffle is thus more effective as it interacts with the viscous medium along the way. Another aspect of a downward extending skirt, or any baffle arranged below the mass is that less viscous medium is needed in the container for the baffle to interact with the medium.

However, in some examples the pendulum mass 20 and the porous structure 22 may be integrally formed. In other words, the porous structure 22 may form the pendulum mass 20 (cf. FIG. 4A).

Suitable materials for the pendulum mass 20 and/or the porous structure 22 may be metallic materials such as steel and other alloys and/or polymers such as elastomers, thermoplastics and/or thermoset plastics, ceramic based materials and/or concrete The porous structure 22 may comprise a channel structure. The channel structure may be disposed at least partly in the mass 18 of the pendulum device 12, particularly in the pendulum mass 18. Said channel structure may define flow paths for the viscous medium 16. Each flow path may include an input opening and an output opening. It is to be understood that the terms input and output opening are defined by the flow direction of the viscous medium through the channel structure, and not by the structure itself. The viscous medium 16 may be deflected between input opening and output opening, when travelling along the flow path. The degree of deflection of the viscous medium 16 may be adapted to achieve a certain damping characteristic of the damping system 10.

Further, the porous structure such as porous baffle 22 may comprise through holes with a diameter ranging from 3 mm to 50 mm. The diameter range may also be set to be from 5 mm to 30 mm. The through holes may have the same diameter, or there may be several kinds of through holes, having different diameters, within the given range. The term "diameter" is to be understood as not limiting the holes to a circular cross section. Rather, the term diameter defines the largest circle that can be inscribed in the respective hole. The holes may have any cross section, such as a circular cross section, a square cross section, a polygonal cross section, an elliptical cross section, and/or the like.

The viscous medium 16 may be selected from the group consisting of: oils, (e.g. mineral oils, silicone oils) and/or water-based fluids. The viscosity of the viscous medium 16 may be from 0.1 to 10 Pa·s, measured at a temperature of 25° C.

It is to be understood, that both the size of the pores and the viscosity of the viscous medium take effect on the damping characteristic. Thus, the size of the pores of the porous structure 22, e.g. the diameter of the channels of a channel structure or the diameter of the through holes, may be chosen in a relation to the viscosity of the viscous medium 16, or vice versa. And in particular, the combination of the pores or holes and the viscous medium may be chosen such that, in oscillation, the viscous medium can pass through the pores and particularly when the viscous medium passes through the pores, vortices or turbulence in the viscous medium is created.

At the same time, the operating temperature of the construction (and particularly the oscillation damping system) may be taken into account. If a temperature is relatively low, the viscosity of the viscous liquid may increase.

Also, the porosity of the porous structure i.e. the percentage of the surface of the porous structure that is open may vary.

Figure 4A:
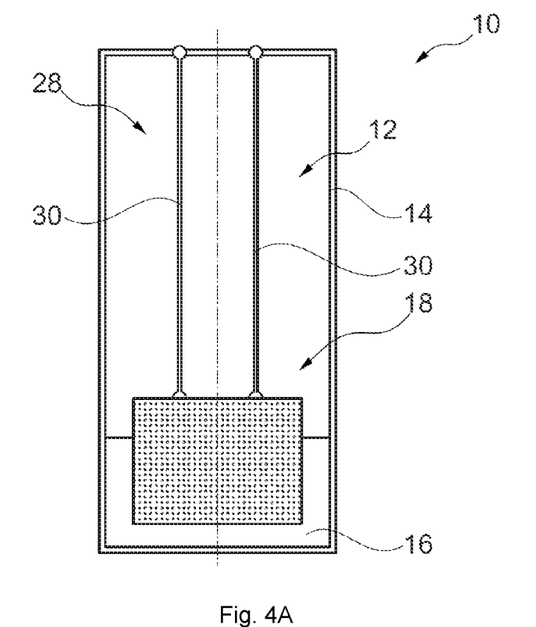
FIG. 4A schematically illustrates a further example of a damping system for counteracting oscillations in a construction.

Further, as illustrated in FIG. 3, the pendulum device 12 may be suspended from a suspension system 28. Said suspension system 28 may comprise at least one wire and/or rod 30, wherein the at least one wire and/or rod 30 may be attached to the mass 18 at a respective suspension point 31. The suspension system 28 may be considered as being a part of the mass 18. The suspension system 28 may be attached to at least one inner surface of the container 14 as illustrated in FIG. 3. FIG. 4A schematically illustrates a further example of a damping system for counteracting oscillations in a construction. In this damping system, the pendulum mass 20 and the porous structure are integrally formed.

Figure 4B:
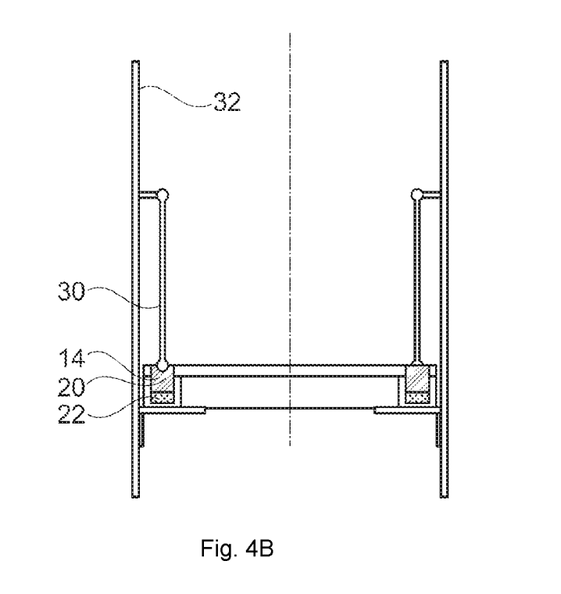
FIG. 4B schematically illustrates a further example of a damping system for counteracting oscillations in a construction.

FIG. 4B schematically illustrates a further example of a damping system for counteracting oscillations in a construction. Here, the mass 18 of the pendulum system is substantially ring-shaped. It is to be noted that the ring formed by the mass 18, including the pendulum mass 20 and the porous structure 22, may be a closed ring (i.e. circular) or an open ring and may comprise separate ring portions. The shape of the container 14 is adapted to the shape of the mass 18. Accordingly, also the container is substantially ring-shaped. The damping system of FIG. 4B provides a free installation space within the ring-shaped structures. Accordingly, supply lines, stairs and/or elevators can be routed through the damping system.

As further illustrated in FIG. 4B, the suspension system 28 may optionally be attached to a surface of the interior of a construction such as a wind turbine tower 170.

Figure 5A:
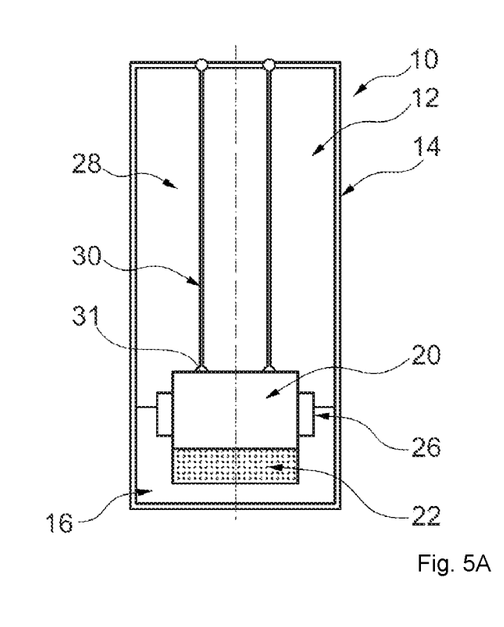
FIG. 5A schematically illustrates a further example of a damping system for counteracting oscillations in a construction.

FIG. 5A illustrates a further example of a damping system 10 for counteracting oscillations in a construction. As illustrated, the damping system 10 may further comprise at least one elastic element 26. Said at least one elastic element 26 may be attached to the mass 18 (as shown) and/or an inside surface of the container 14 (not shown). The at least one elastic element 26 may be configured to limit the maximum displacement of the mass 18 of the pendulum device 12. The elastic element 26 may be formed as an elastomeric block. Further, the elastic element 26 may be provided as an elastic tape, string, spring, rope, wire and/or cable connected to the pendulum device 12 and the container 14 in order to limit the maximum displacement of the mass 18 of the pendulum device 12. Another possible example for such an elastic element 26, as illustrated FIG. 5A, is an elastic stopper element that is attached to the mass 18 and/or an inside surface of the container 14. Further, the multiple elastic elements 26, e.g. said elastic stopper elements, may be mounted around a circumference of the mass 18 and/or a circumference of the container 14, forming a ring or a series of individual elastic elements 26. Suitable materials for the elastic elements 26 may be: soft metals and/or polymers such as elastomers, thermoplastics and/or thermoset plastics. The elastic stopper element may have a role in attenuating impact from a pendulum at the container and also to dissipate energy of the oscillation.

The damping system 10 in other examples may further comprise friction plates (not shown), wherein the friction plates may be adapted to dampen oscillations of the mass 18. The underlying damping mechanism may rely on a relative motion between at least two friction plates, being at least partially in contact. The at least two friction plates may optionally be attached to the container 14, the mass 18 and/or the suspension system 28. The material pairing of the at least two friction plates may be metallic and/or polymeric.

Figure 5B:
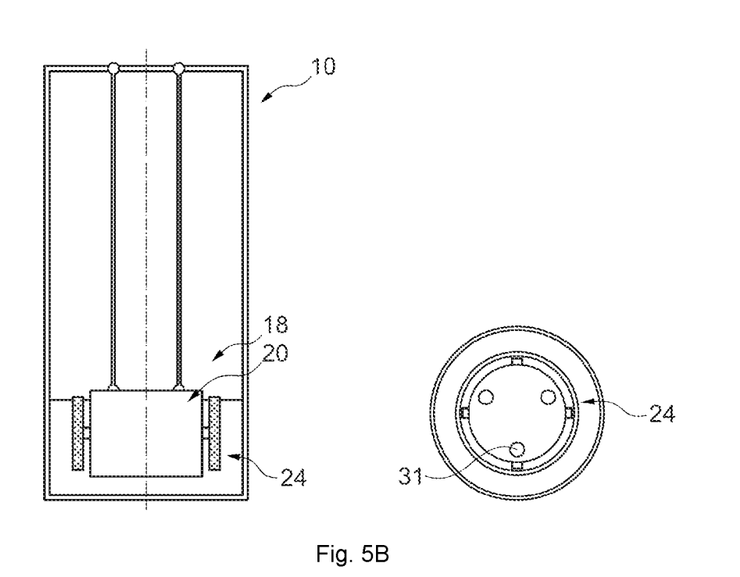
FIG. 5B schematically illustrates a further example of a damping system for counteracting oscillations in a construction.
Figure 5C:
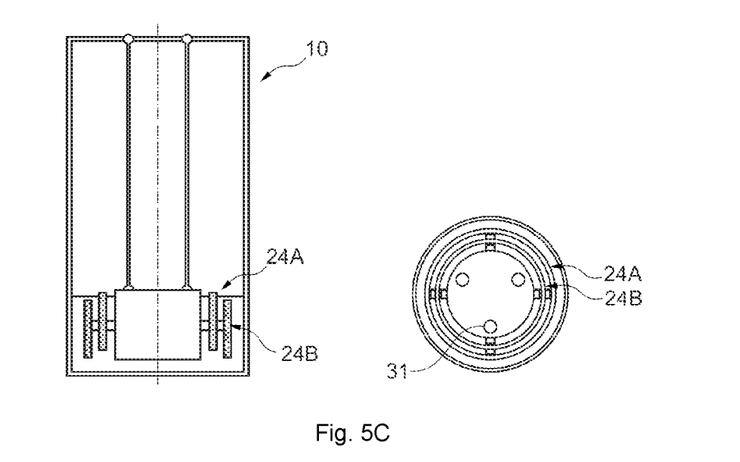
FIG. 5C schematically illustrates a further example of a damping system for counteracting oscillations in a construction.

FIGS. 5B and 5C exemplary illustrate further examples of a damping system 10 for counteracting oscillations in a construction. As illustrated in 5B and 5C, the porous structure 22 may comprise at least one porous baffle 24. The at least one porous baffle 24 may be attached below, above and/or laterally relative to the pendulum mass 20, when seen in a neutral position of the pendulum mass 20. The neutral position of the pendulum mass 20 corresponds to a non-deflected state of the pendulum device 12.

The at least one porous baffle 24 may be cylindrical as further illustrated in FIGS. 5B and 5C. Further, the at least one cylindrical porous baffle 24 may encircle the pendulum mass 20 at least partially.

As illustrated in FIG. 5C, the porous structure 22 may comprise multiple porous baffles 24, that can be arranged concentrically. The multiple porous baffles may be arranged such that the baffles have both vertical and horizontal offsets between them. In further examples, the porous baffles 24 may be arranged in a crossed, starred and/or circular pattern. Suitable materials for said porous baffles 24 may be: metallic materials such as steel and other alloys and/or polymers such as elastomers, thermoplastics and/or thermoset plastics.

The various features of the different examples of the damping systems may be combined i.e. different mass shapes may be combined with different baffle shapes and configurations and different baffle shapes and configurations may be combined with different elastic elements.

Figure 6A:
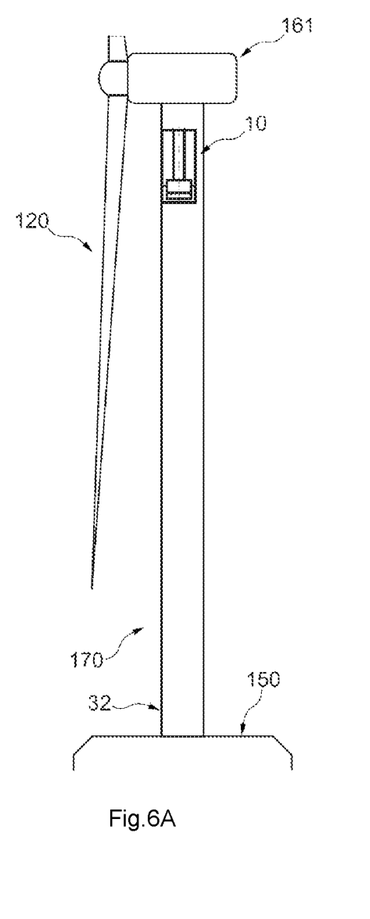
FIGS. 6A-B schematically illustrate examples of wind turbine towers comprising a tower structure and a damping system, and FIG. 7 schematically illustrates a flow diagram of a method for counteracting oscillations in a construction.
Figure 6B:
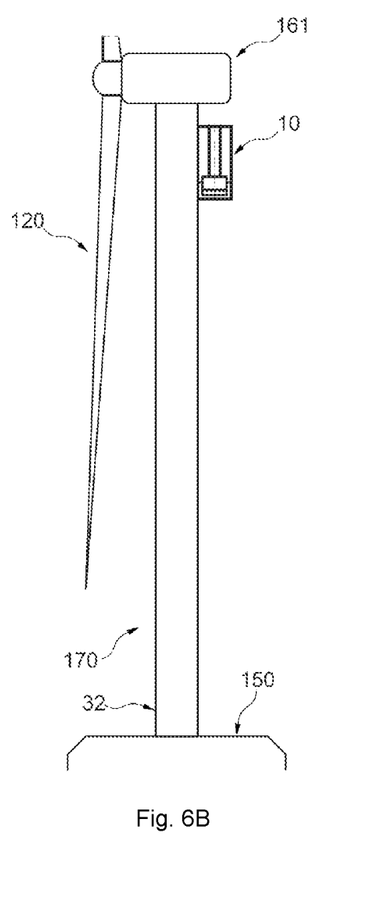

FIGS. 6A to 6B schematically illustrate two examples of a wind turbine tower 170, comprising a tower structure 32 and one of the herein described damping systems 10. As illustrated, the damping system 10 may be attached to the tower structure 32. The damping system 10 may be attached at an inside (cf. FIG. 6A) or outside (cf. FIG. 6B) of the tower structure 32. In other examples more than one of the damping systems 10 may be attached to the tower structure 32. In case of multiple damping systems, those systems may be arranged at different heights along the tower. As FIG. 6A further illustrates, the damping system 10 may be installed when the nacelle 161 is not already mounted.

As shown in the examples of FIGS. 6A and 6B, the damping systems may be arranged particularly along an upper half, and more particularly along an upper third of the height of the tower.

In any of the examples disclosed herein, porosity of the baffles (i.e. a percentage of the surface area of a baffle occupied by holes as a percentage of the total surface area of the baffle) may be 25-65%, and specifically between 30-50%. The dimensions of the baffles may be determined particularly in relation with the size of the mass of the pendulum. In some examples, the area of the baffles (disregarding the holes) may be between 10-30% of the surface area of the side surfaces of the mass.

In any of the examples disclosed herein, the level of viscous fluid in the container may be such that only a part of the mass is suspended in the fluid. In particular, less than 50% of the height of the mass with baffles may be suspended in the fluid.

Figure 7:
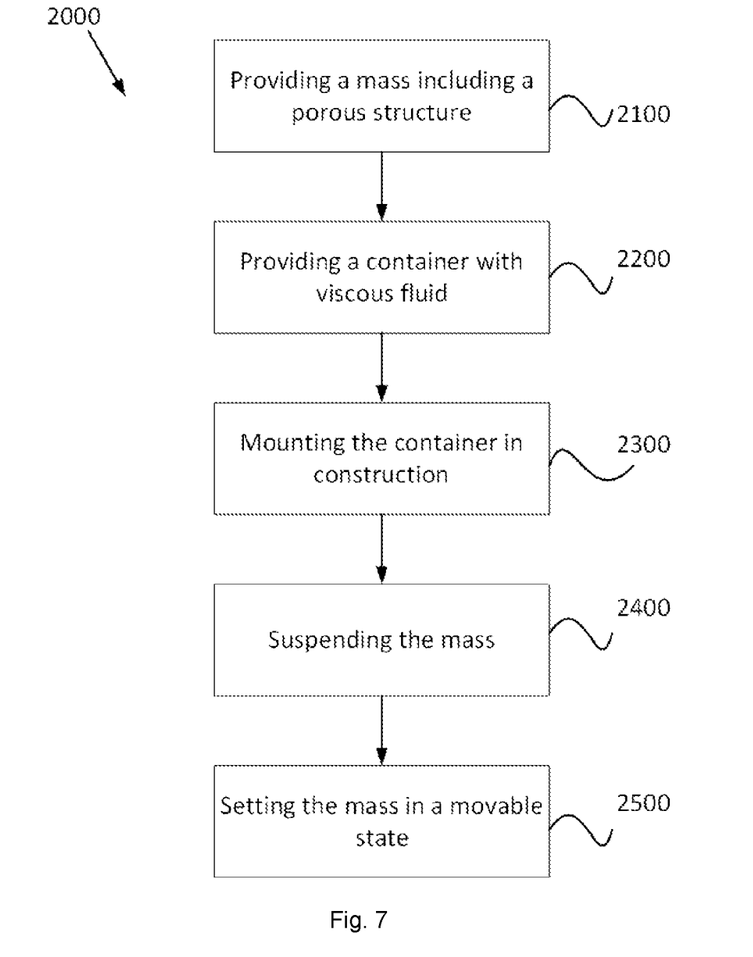

FIG. 7 illustrates a flow diagram of an example of a method 2000 for counteracting oscillations in a construction. The method 2000 for counteracting oscillations in a construction is provided. The method comprises providing, at block 2100, a mass, wherein the mass includes a porous structure. The mass may be configured according to any of the examples herein disclosed.

The method 2000 of FIG. 7 further comprises providing, at block 2200, a container with viscous fluid and mounting, at block 2300, the container with viscous fluid inside the construction. The method further comprises, at block 2400, suspending the mass, such that the porous structure of the mass is at least partially submerged in the viscous fluid.

The container, the viscous fluid, and the mounting in the construction may be according to any of the examples disclosed herein.

The method herein disclosed may be carried out as part of an installation of a construction, e.g. a wind turbine tower. That is, the method as herein described may be carried out during installation or commissioning of the wind turbine, before operation starts. In other examples, such a method may be carried out as part of a retrofitting procedure. A wind turbine may have been operating and may be found to suffer from larger than foreseen oscillations. A tuned mass damper according to any of the examples described herein may then be installed in the wind turbine. In yet other examples, a wind turbine (or other construction) may already include a tuned mass damper. The method includes adding a container with viscous fluid, and adding a porous element such as a baffle to the mass such that the porous element of the mass is partially submerged in the viscous fluid.

Thereby the suspension system 28 and/or the container 14 may be attached inside or outside a construction. Further, the fixation may be realized by any suitable attachment or fastener, including e.g. form-fit connection means or material connection. Further, the method 2000 may comprise setting, at block 2500, the mass 18 to a movable state, wherein the mass 18 is enabled to move and thereby may dampen oscillations. The opposite to the moveable state may be considered as the blocked state. The configuration of the pendulum device 12 in the blocked state, wherein the mass 18 is not able to move and does not dampen oscillations, may be used during transportation and while attaching the damping system 10 to the construction.

In accordance with various examples disclosed herein, a tuned mass damper for counteracting oscillations in a construction is provided. The tuned mass damper comprises a suspended mass, wherein the suspended mass is configured to interact with a viscous fluid through a porous structure such that the porous structure of the suspended mass creates turbulence in the viscous fluid when the suspended mass oscillates.

In examples, the suspended mass may include a porous baffle, wherein the porous baffle is arranged within the viscous fluid. In some examples, the viscous liquid may be provided in a container within a wind turbine tower.

Also shown herein is a tower, particularly, a wind turbine tower 170 comprising a tower structure 32. The tower including one or more tuned mass dampers including a suspended mass with porous structure that is configured to interact with a viscous fluid such that the suspended mass creates turbulence in the viscous fluid when the suspended mass oscillates.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have fastening elements that do not differ from the literal language of the claims, or if they include equivalent fastening elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

LIST OF REFERENCE SIGNS

- 10 damping system
- 12 pendulum device
- 14 container
- 16 viscous medium
- 18 mass
- 20 pendulum mass
- 22 porous structure
- 24 porous baffle
- 26 elastic element
- 28 suspension system
- 30 wire or rod
- 31 suspension point
- 32 tower structure
- 100 pitch bearing
- 107 pitch system
- 108 pinion
- 109 annular gear
- 110 hub of a wind turbine
- 115 rotor
- 120 wind turbine blade (blade)
- 150 support surface
- 160 wind turbine
- 161 nacelle
- 162 generator
- 163 rotor shaft
- 164 gearbox
- 165 support frame
- 166 generator shaft
- 170 wind turbine tower (tower)
- 2000 method for counteracting oscillations
- 2100 providing a mass with porous structure
- 2200 providing a container with viscous fluid
- 2300 mounting the container
- 2400 suspending the mass
- 2500 setting the mass in a movable state

The invention claimed is:

1. A damping system for counteracting oscillations in a construction, the damping system comprising:
   a pendulum device; and
   a container containing a viscous medium;
   the pendulum device comprising a pendulum mass, the pendulum mass comprising a porous structure configured thereon;
   the porous structure is at least partially submerged in the viscous medium;
   the porous structure formed from an incompressible material selected from one of: steel, steel alloy, plastic material, ceramic material, or concrete; and
   the porous structure defining a baffle formed as a downward extending skirt on a lower-most portion of the pendulum mass, the baffle comprising passages defined completely therethrough such that movement of the pendulum mass back and forth from a neutral position causes flow of the viscous medium completely through the passages to induce vortices or turbulence in the viscous medium to dampen the oscillations.

2. The damping system according to claim 1, wherein the porous baffle is cylindrical.

3. The damping system according to claim 2, wherein the cylindrical porous baffle encircles the pendulum mass at least partially.

4. The damping system according to claim 1, wherein the porous structure comprises a plurality of the porous baffles arranged in a pattern on the pendulum mass.

5. The damping system according to claim 1, further comprising at least one elastic element configured to limit a maximum displacement of the pendulum mass.

6. The damping system according to claim 1, wherein the passages comprise pores, channels or holes with a diameter ranging from 3 mm to 50 mm.

7. The damping system according to claim 1, wherein the viscous medium is selected from the group consisting of: oils and water-based fluids.

8. The damping system according to claim 1, wherein the viscosity of the viscous medium ranges from 0.1 to 10 Pa.s, measured at a temperature of 25° C.

9. A wind turbine, comprising:
   a wind turbine tower; and
   the damping system according to claim 1 mounted within an upper half of a height of the wind turbine tower.

10. A method for counteracting oscillations in a construction, comprising:
    providing a container with viscous fluid;
    mounting the container with viscous fluid inside the construction;
    suspending a pendulum mass having a porous structure configured thereon such that the porous structure is at least partially submerged in the viscous fluid; and
    wherein the porous structure includes a baffle formed as a downward extending skirt on a lower-most portion of the pendulum mass, the baffle comprising passages defined completely therethrough, the passages having a cross-sectional size and provided in a number such that movement of the pendulum mass back and forth from a neutral position causes flow of the viscous medium completely through the passages to induce vortices or turbulence in the viscous medium as the primary operational structure of the baffle to dampen the oscillations.

11. The method according to claim 10, wherein the construction is a wind turbine tower.

* * * * *